Aug. 29, 1950     I. H. BULLOCK     2,520,876
CORE BIT
Filed May 13, 1949
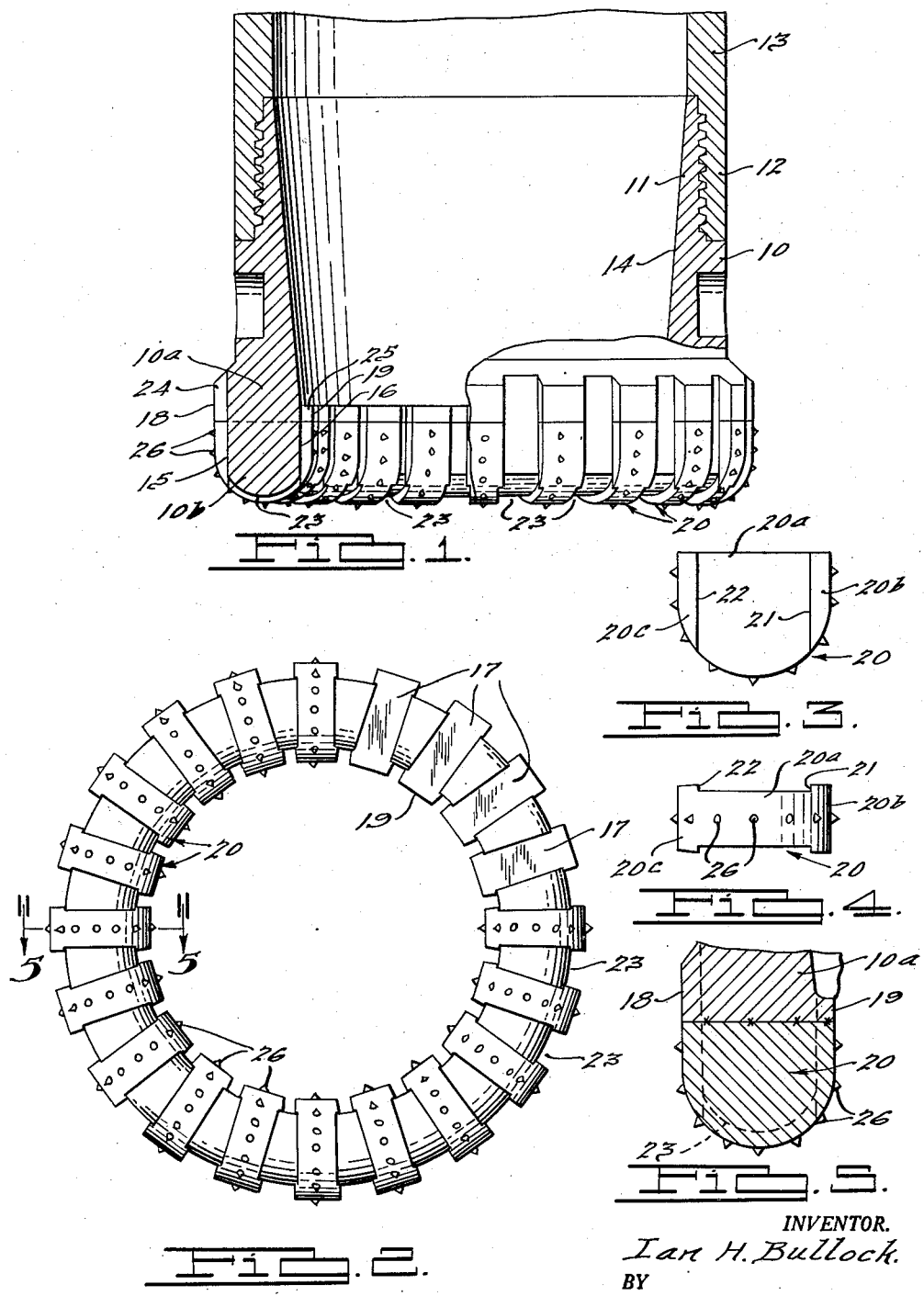
INVENTOR.
*Ian H. Bullock.*
BY
*Elmer Jamison Gray*
ATTORNEY.

Patented Aug. 29, 1950

2,520,876

UNITED STATES PATENT OFFICE 2,520,876

CORE BIT

Ian H. Bullock, Detroit, Mich., assignor to Koebel Diamond Tool Company, Detroit, Mich., a corporation of Michigan Application May 13, 1949, Serial No. 93,153

4 Claims. (Cl. 255—72)

This invention relates generally to core bits or similar tools useful, for example, in drilling into hard earth strata, rock formations, sandstone and the like. Core bits are frequently equipped with diamonds on the cutting portions therewith in order to increase the drilling rate and prolong the life of the bits, and such tools, known as diamond core bits, are widely used in the oil fields for drilling oil wells and also for other purposes, such as to make soundings in order to obtain specimens of earth formations for geological analysis.

It has frequently been the practice in the manufacture of core bits to provide the tubular supporting body of the core bit with a series of annularly spaced radial slots milled in the end thereof to receive a corresponding series of diamond studded slugs or drilling elements which are fitted into the slots and secured in place, usually by brazing. Considerable difficulties have been encountered in maintaining the drilling elements or diamond studded cutting inserts in proper place against displacement during the brazing operation. When the body and assembled cutting inserts are heated in order to braze the inserts in place, the body expands somewhat leaving the inserts loose in the slots and free to shift therein radially out of their proper locations. This is particularly true in the case of core bits in which the body is in the form of a steel forging and the drill inserts or cutting elements are produced from sintered powdered or comminuted metal alloys which have a lesser coefficient of expansion than the metal of the body.

One method heretofore resorted to for the purpose of holding the drill inserts in place during the brazing operation has been to insert a carbon plug within the core bit body so as to restrict inward radial displacement of the inserts, and to place a carbon ring around the outside of the body in order to limit outward radial displacement of the inserts. Such method as well as others resorted to for this purpose have not been satisfactory and, in addition, have been time consuming and relatively costly.

An important object of the present invention is to overcome the foregoing disadvantages and to provide an improved core bit which can be manufactured more economically and easily, and wherein the construction is such as to ensure accurate location of the cutting inserts or elements in the head and the maintenance of such location during the brazing operation.

A further object of the invention is to provide an improved core bit having cutting inserts or drill elements brazed into slots or recesses in the body of the core bit and held accurately in predetermined positions under all conditions.

Still another object of the invention is to provide an improved core bit in which the drill inserts or elements are positioned in slots in the end of the core bit body and firmly anchored therein against radial displacement not only during the operation of brazing the inserts within the slots but also during use of the core bit when performing drilling operations.

More specifically an object of the invention is to provide milled slots in the end of the core bit body to receive the cutting inserts and to form the latter at the inner and outer sides thereof with shoulders engaging the inner and outer walls of the body so as to positively hold the inserts in proper locations against radial displacement in either direction both during the operation of brazing the inserts within the slots and also during use of the core bit.

Other objects of this invention will appear in the following description and appended claims, reference being had to the accompanying drawings forming a part of this specification wherein like reference characters designate corresponding parts in the several views.

Fig. 1 is a fragmentary sectional elevation illustrating the core bit, constructed in accordance with the present invention, attached to the end of a core barrel.

Fig. 2 is a bottom plan view of the core bit with several of the drill inserts removed for the purposes of clarity.

Fig. 3 is a side elevation of one of the drill inserts.

Fig. 4 is a bottom plan view thereof.

Fig. 5 is a fragmentary section taken substantially through lines 5—5 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

One embodiment of the invention comprises in general a tubular core bit body attachable to the end of a core barrel and provided at its opposite end with an annularly spaced series of radially extending slots. Insertible into each slot is a cutting insert or slug, preferably studded on its outer surface with diamonds, and enlarged at opposite sides thereof to form inner and outer pairs of shoulders adapted to overlap the inner and outer peripheral walls of the core bit body along the edges of the slot. The inner and outer side walls of the body in the height of the slots therein are machined straight so as to be smoothly engaged by the straight surfaces of the shoulders formed on the cutting inserts. By virtue of this construction the cutting inserts, when fitted into the slots in the body, are interlocked with the latter and held against radial displacement during the operation of brazing the inserts within the slots. The inserts protrude beyond the end of the body and also inwardly and outwardly thereof so as to form intervening channels or water courses.

Referring to the embodiment of the invention illustrated, by way of example, in the drawings, there is provided a core bit having an annular body 10 reduced and exteriorly threaded at its upper end 11 for attachment to the interiorly screw threaded end 12 of a conventional core barrel 13. It will be understood that during a drilling operation the core barrel and bit are rotated about the longitudinal axis thereof at a suitable speed, and the core bit cuts a generally circular hole and at the same time separates from the earth a central core which is forced upwardly through the bit and barrel as the drilling operation proceeds. The core bit body 10 is formed with an internal tapering annular wall 14 within which is mounted, in accordance with conventional practice, a core catcher. The body of the core bit has an enlarged annular portion 10a which is reduced and machined to provide a straight wall 15 extending entirely around the outer periphery of the body. This straight wall 15 is circular and has its center of curvature at the central longitudinal axis of the body. Similarly, the inner wall of the enlarged portion 10a of the body is reduced and machined to provide a straight wall 16 extending entirely around the inner periphery of the body, this wall 16 being circular and concentric with the wall 15. Thus, the lower end of the body has an annular reduced portion 10b provided with axially straight parallel inner and outer surfaces.

The reduced portion 10b of the body is milled to provide a series of annularly spaced radial slots 17 extending the full height of the body portion 10b and preferably having straight parallel opposed side walls. The bottoms of these slots terminate at the enlarged body portion 10a which projects outwardly and inwardly of the reduced end portion 10b to form outer and inner arcuate shoulders 18 and 19 protruding beyond the terminal edges of the slots.

Adapted to be anchored within each slot 17 is a drill insert or slug 20 having an intermediate body portion 20a of a length and width corresponding to the slot 17 and adapted to fit snugly therein. The body portion 20a terminates at its outer and inner ends in enlarged portions 20b and 20c forming outer and inner pairs of shoulders 21 and 22. Since the enlarged ends of each insert 20 are identical, it will be apparent that the inserts may be reversibly positioned within the slots. The surfaces of the shoulders 21 and 22, as shown in Fig. 3, are axially straight and preferably slightly arcuate so that when the insert is slid into a slot the shoulders 21 and 22 will overlap and smoothly engage the outer and inner straight walls 15 and 16 of the body along the outer and inner edges of the slot. Each insert is preferably crowned at its end so as to project somewhat below the lower ends of the shoulders 21 and 22, as shown in Fig. 3, and the height of each insert is greater than the depth of the slot so as to cause the crowned end of the insert to protrude below the reduced portion 10b of the body. The upper face 20d of each insert is flat so as to bottom smoothly against the flat bottom of the slot 17, and it will be noted that when the inserts are positioned within the slots, the portions 20b and 20c thereof will protrude outwardly and inwardly of the walls 15 and 16 of the reduced body portion 10b. By virtue of this construction a water course 23 is provided between each adjacent pair of drill inserts which extends continuously around the bottom and sides of the body portion 10b. The outer side of the enlarged body portion 10a is machined to provide channels or water courses 24 registering and communicating with the outer portions of the water courses 23, and the inner side of the body portion 10a is likewise machined to provide channels or water courses 25 registering and communicating with the inner portions of the water courses 23. It will be seen that between each adjacent pair of channels 24 and 25 the body portion 10a provides the shoulder portions 18 and 19 which conform to the portions 20b and 20c of the insert and against which the latter abut. Each insert is preferably studded with protruding diamonds 26 which may be of any suitable number and arranged in any desired pattern so as to ensure the greatest cutting efficiency during drilling operations.

From the foregoing it will be seen that when the drill inserts 20 are assembled within the slots 17 in the core bit body each insert will be interlocked with the body by means of the shoulders 21 and 22 so as to positively prevent any possibility of radial displacement thereof during the operation of brazing the inserts within the slots. These shoulders on the inserts, which overlap the outer and inner edges of the slots, not only maintain the inserts accurately in position during the brazing operation but also assist in resisting radial dislodgement of the inserts during use of the core bit.

In accordance with the preferred embodiment of my invention the body 10 of the core bit is in the form of a steel forging which may be readily machined as above described, and the drill elements or inserts 20 are each in the form of a matrix of sintered powdered or comminuted metal alloy equipped with diamonds and presenting surfaces which are relatively hard and wear resistant.

I claim:

1. A core bit comprising a tubular body provided at one end with an annularly spaced series of radially extending slots, a corresponding series of drill inserts permanently secured within said slots, each insert having an intermediate portion fitting within a slot and terminating in enlarged portions protruding beyond the opposed inner and outer ends of the slot, each such enlarged end portion extending circumferentially beyond the adjacent edges of the slot to overlap and abut against the body thereby to restrain radial displacement of the insert within the slot, said body being interiorly and exteriorly relieved between adjacent enlarged end portions of the inserts to form water courses.

2. A core bit comprising a tubular body having one end portion reduced to provide inner and outer annular walls extending substantially straight in a direction axially of the body, said reduced end portion of the body being provided with an annularly spaced series of radially extending slots, a corresponding series of drill inserts secured within said slots and protruding radially and axially beyond said reduced end portion to form intervening water courses, the radially protruding portions of each insert being circumferentially wider than its slot to overlap the body along the inner and outer terminal edges of the slot.

3. A core bit comprising a tubular body having one end portion reduced to provide inner and outer annular walls extending substantially straight in a direction axially of the body, said reduced end portion of the body being provided with an annularly spaced series of radially extending slots, a corresponding series of drill inserts secured within said slots and protruding radially and axially beyond said reduced end portion to form intervening water courses, the radially protruding portions of each insert being circumferentially wider than its slot to overlap the body along the inner and outer terminal edges of the slot, said body adjacent said reduced end portion having inner and outer channels communicating with said water courses.

4. A core bit comprising a tubular body having one end portion reduced to provide inner and outer annular walls extending substantially straight in a direction axially of the body, said reduced end portion of the body being provided with an annularly spaced series of radially extending slots, a corresponding series of drill inserts secured within said slots and protruding radially and axially beyond said reduced end portion to form intervening water courses, the radially protruding portions of each insert being circumferentially wider than its slot to overlap the body along the inner and outer terminal edges of the slot, said body adjacent said reduced end portion having portions overlapping said radially protruding portions of the inserts and having intervening channels communicating with said water courses.

IAN H. BULLOCK.

REFERENCES CITED

The following references are of record in the file of this patent:

UNITED STATES PATENTS

| Number | Name | Date |
|---|---|---|
| 52,148 | Dow | Jan. 23, 1866 |
| 1,041,568 | Bade | Oct. 15, 1912 |
| 1,244,227 | Miller | Oct. 23, 1917 |
| 1,703,390 | Duffy | Feb. 26, 1929 |
| 2,182,562 | Koebel | Dec. 5, 1939 |